US012256203B2

(12) United States Patent
Kurihara

(10) Patent No.: US 12,256,203 B2
(45) Date of Patent: Mar. 18, 2025

(54) EAR-WORN DEVICE AND REPRODUCTION METHOD

(71) Applicant: Panasonic Intellectual Property Management Co., Ltd., Osaka (JP)

(72) Inventor: Shinichiro Kurihara, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 232 days.

(21) Appl. No.: 17/918,729

(22) PCT Filed: Oct. 29, 2021

(86) PCT No.: PCT/JP2021/040129
§ 371 (c)(1),
(2) Date: Oct. 13, 2022

(87) PCT Pub. No.: WO2022/137806
PCT Pub. Date: Jun. 30, 2022

(65) Prior Publication Data

US 2023/0239617 A1 Jul. 27, 2023

(30) Foreign Application Priority Data

Dec. 25, 2020 (JP) ................................ 2020-216390

(51) Int. Cl.
*H04R 3/04* (2006.01)
*G10L 25/21* (2013.01)
*H04R 1/10* (2006.01)

(52) U.S. Cl.
CPC ................ *H04R 3/04* (2013.01); *G10L 25/21* (2013.01); *H04R 1/1016* (2013.01); *H04R 1/1041* (2013.01); *H04R 1/1075* (2013.01)

(58) Field of Classification Search
CPC ...... H04R 3/04; H04R 1/1016; H04R 1/1041; G10L 25/21
(Continued)

(56) References Cited

U.S. PATENT DOCUMENTS

2008/0205659 A1* 8/2008 Fischer ................ H04R 25/552
381/23.1
2012/0189147 A1 7/2012 Terada et al.
(Continued)

FOREIGN PATENT DOCUMENTS

EP 2790417 A1 10/2014
JP 2011-081033 A 4/2011
(Continued)

OTHER PUBLICATIONS

Japanese Office Action dated Feb. 13, 2024 issued in the corresponding Japanese Patent Application No. 2022-571924.
(Continued)

*Primary Examiner* — Thjuan K Addy
(74) *Attorney, Agent, or Firm* — Rimon P.C.

(57) ABSTRACT

An ear-worn device includes: a microphone that obtains a sound and outputs a sound signal of the sound obtained; a DSP that performs signal processing on the sound signal to determine whether speech contained in the sound has reverberance, and outputs, based on a result of the determination, a first sound signal obtained by performing first signal processing on the sound signal; a loudspeaker that reproduces the sound based on the first sound signal output; and a housing that contains the microphone, the DSP, and the loudspeaker.

15 Claims, 10 Drawing Sheets

(58) Field of Classification Search
USPC .................................... 381/74, 312, 23.1, 59
See application file for complete search history.

(56) References Cited

U.S. PATENT DOCUMENTS

| | | | |
|---|---|---|---|
| 2012/0250915 | A1 | 10/2012 | Takagi et al. |
| 2015/0189449 | A1 | 7/2015 | Udesen |
| 2016/0064011 | A1 | 3/2016 | Sunohara et al. |

FOREIGN PATENT DOCUMENTS

| | | | |
|---|---|---|---|
| JP | 2012-109933 | A | 6/2012 |
| JP | 2012-249184 | A | 12/2012 |
| JP | 2015-144430 | A | 8/2015 |
| JP | 2016-054421 | A | 4/2016 |
| JP | 2020-028016 | A | 2/2020 |
| WO | 2011/048813 | A1 | 4/2011 |
| WO | 2016/042410 | A1 | 3/2016 |

OTHER PUBLICATIONS

International Search Report issued on Dec. 14, 2021 in International Patent Application No. PCT/JP2021/040129, with English translation.
Japanese Office Action dated Oct. 10, 2023 issued in the corresponding Japanese Patent Application No. 2022-571924.
Extended European Search Report dated Jun. 17, 2024 issued in the corresponding European Patent Application No. 21909962.9.

* cited by examiner

EAR-WORN DEVICE AND REPRODUCTION METHOD

CROSS-REFERENCE OF RELATED APPLICATIONS

This application is the U.S. National Phase under 35 U.S.C. § 371 of International Patent Application No. PCT/JP2021/040129, filed on Oct. 29, 2021, which in turn claims the benefit of Japanese Application No. 2020-216390, filed on Dec. 25, 2020, the entire disclosures of which Applications are incorporated by reference herein.

TECHNICAL FIELD

The present disclosure relates to an ear-worn device and a reproduction method.

BACKGROUND ART

Various techniques for ear-worn devices such as earphones and headphones have been proposed. Patent Literature (PTL) 1 discloses a technique for canal-type earphones.

CITATION LIST

Patent Literature

[PTL 1]
Japanese Unexamined Patent Application Publication No. 2012-249184

SUMMARY OF INVENTION

Technical Problem

The present disclosure provides an ear-worn device that can perform signal processing while distinguishing between a sound signal of a sound having a relatively strong direct sound component and a sound signal of a sound having a relatively strong indirect sound component.

Solution to Problem

An ear-worn device according to an aspect of the present disclosure includes: a microphone that obtains a sound and outputs a sound signal of the sound obtained; a signal processing circuit that performs signal processing on the sound signal to determine whether speech contained in the sound has reverberance, and outputs, based on a result of the determination, a first sound signal obtained by performing first signal processing on the sound signal; a loudspeaker that reproduces the sound based on the first sound signal output; and a housing that contains the microphone, the signal processing circuit, and the loudspeaker.

Advantageous Effects of Invention

The ear-worn device according to an aspect of the present disclosure can perform signal processing while distinguishing between a sound signal of a sound having a relatively strong direct sound component and a sound signal of a sound having a relatively strong indirect sound component.

DESCRIPTION OF EMBODIMENTS

Figure 1:
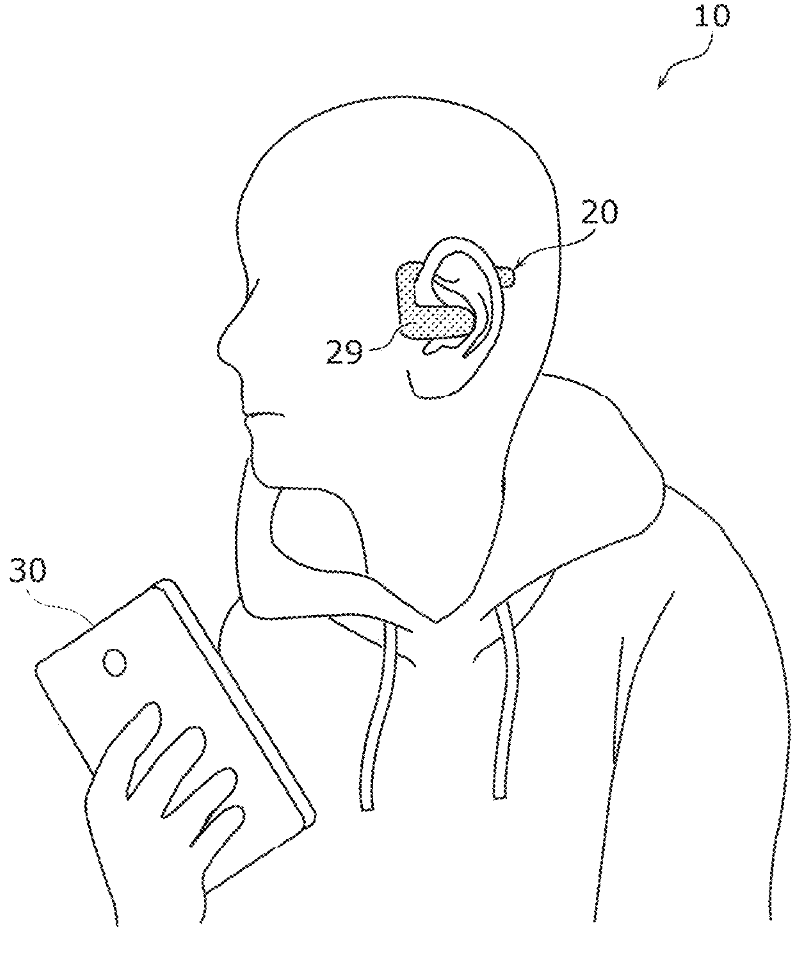
FIG. 1 is an external view of a device included in a sound signal processing system according to an embodiment.

An embodiment will be described in detail below, with reference to the drawings. The embodiment described below shows a general and specific example. The numerical values, shapes, materials, structural elements, the arrangement and connection of the structural elements, steps, the order of steps, etc. shown in the following embodiment are mere examples, and do not limit the scope of the present disclosure. Of the structural elements in the embodiment described below, the structural elements not recited in any one of the independent claims are described as optional structural elements.

Each drawing is a schematic, and does not necessarily provide precise depiction. In the drawings, structural elements that are substantially the same are given the same reference marks, and repeated description may be omitted or simplified.

Embodiment

[Structure]

Figure 2:
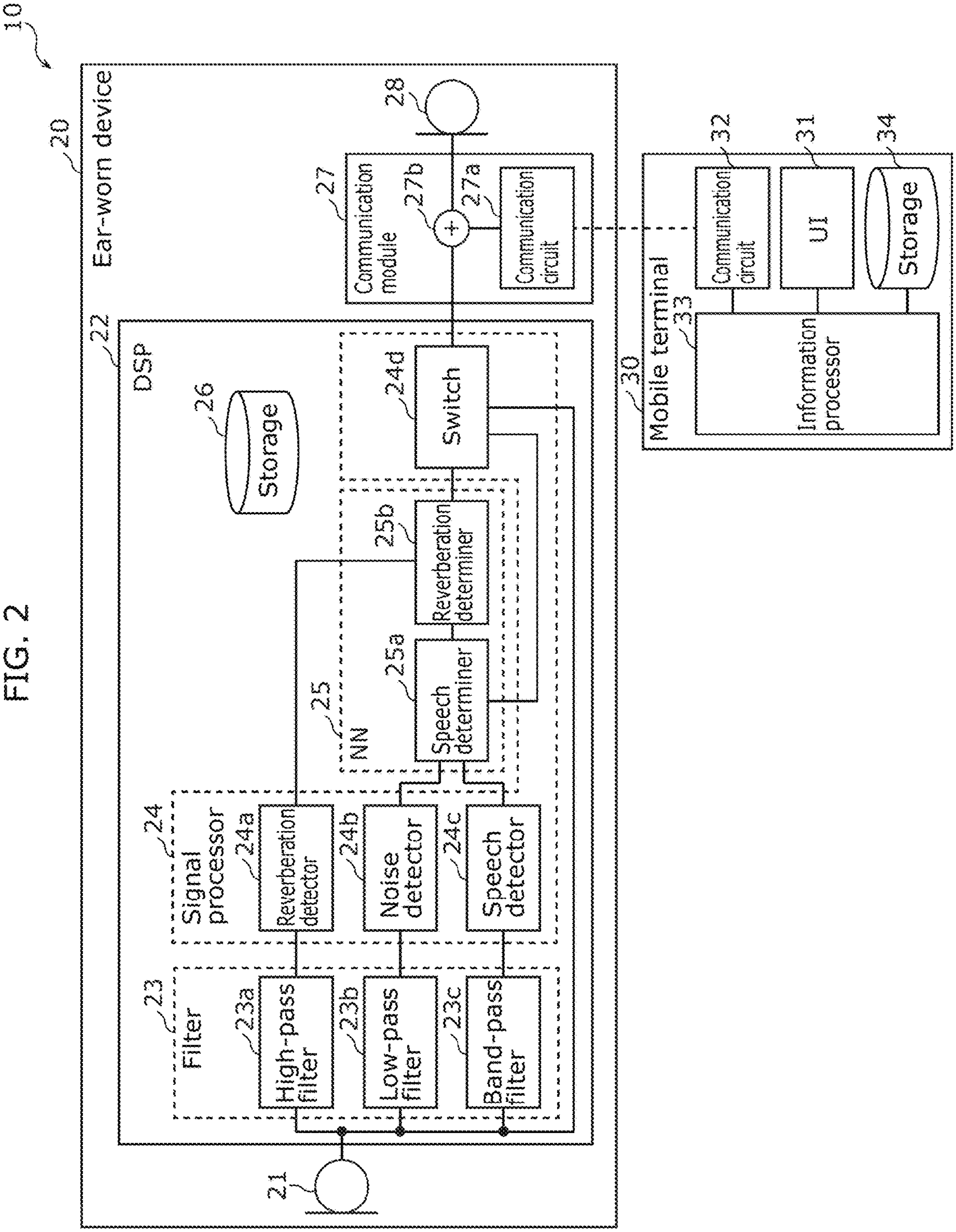
FIG. 2 is a block diagram illustrating the functional structure of the sound signal processing system according to the embodiment.

The structure of a sound signal processing system according to the embodiment will be described below. FIG. 1 is an external view of a device included in the sound signal processing system according to the embodiment. FIG. 2 is a block diagram illustrating the functional structure of the sound signal processing system according to the embodiment.

As illustrated in FIG. 1 and FIG. 2, sound signal processing system 10 according to the embodiment includes ear-worn device 20 and mobile terminal 30.

First, ear-worn device 20 will be described below. Ear-worn device 20 is an earphone-type device that reproduces a third sound signal provided from mobile terminal 30. The third sound signal is, for example, a sound signal of music content. Ear-worn device 20 has a noise canceling function of reducing environmental sound (noise) around the user wearing ear-worn device 20 during the reproduction of the third sound signal (music content), Ear-worn device 20 also has an external sound capture function of capturing sound around the user during the reproduction of the third sound signal, Ear-worn device 20 can also distinguish whether human speech is an utterance sound that directly reaches the user (i.e. sound heard when the user is spoken to by a person) or an announcement sound, and selectively apply the external sound capture function to one of the utterance sound that directly reaches the user and the announcement sound.

The "utterance sound that directly reaches the user" is a sound that has a strong direct sound component relative to an indirect sound component and has low reverberance (i.e. reverberation feeling). The "announcement sound" is human speech that is output from a loudspeaker and reaches ear-worn device 20, and is a sound that has a strong indirect sound component relative to a direct sound component and has high reverberance, Specifically, the announcement sound is a sound output for guidance at an airport or a station, on a train, or the like.

The "direct sound" is a sound that reaches directly from a sound source without being reflected. The "indirect sound" is a sound that reaches after being reflected one or more times by objects from a sound source. When a sound from the same sound source reaches the listener as a direct sound and one or more indirect sounds, the sounds vary in frequency characteristics and phase depending on the path. The listener hearing the superimposed sound of these sounds experiences low reverberance if the direct sound is relatively strong, and experiences high reverberance if the direct sound is relatively weak. For example, the reverberance is low in the case where a person directly speaks to the listener, and high in the case of an announcement sound (in a usual situation and not in a special situation such as hearing sound at a location very close to the loudspeaker).

Ear-worn device 20 estimates whether the sound is an announcement sound or a sound directly spoken by a person, according to the level of reverberance. Ear-worn device 20 can then selectively apply the external sound capture function to one of the utterance sound that directly reaches the user and the announcement sound.

The "reverberance" means, for example, that, after a direct sound is heard, one or more indirect sounds reflected by a wall, a ceiling, etc, are heard within a few milliseconds to a few hundred milliseconds like one sound flow together with the direct sound. That is, a sound with reverberance is a sound obtained by superimposing a direct sound and one or more indirect sounds that reach from various directions after the direct sound. A sound without reverberance is a sound in which a direct sound is dominant and one or more superimposed indirect sounds are audibly small or within a negligible level.

Specifically, ear-worn device 20 includes microphone 21, DSP 22, communication module 27, and loudspeaker 28. Microphone 21, DSP 22, communication module 27, and loudspeaker 28 are contained in housing 29 (illustrated in FIG. 1).

Microphone 21 is a sound pickup device that obtains a sound around ear-worn device 20 and outputs a sound signal of the obtained sound, Non-limiting specific examples of microphone 21 include a condenser microphone, a dynamic microphone, and a microelectromechanical systems (MEMS) microphone. Microphone 21 may be omnidirectional or may have directivity.

DSP 22 performs signal processing on the sound signal output from microphone 21 to achieve the noise canceling function and the external sound capture function. The noise canceling function is a function of inverting the phase of the sound signal and reproducing the resultant sound signal by loudspeaker 28 to reduce noise. The external sound capture function is a function of, for example, subjecting the sound signal to equalizing processing for enhancing a specific frequency component (for example, frequency component of 100 Hz or more and 2 kHz or less) of the sound and reproducing the resultant sound signal by loudspeaker 28 to enhance the specific frequency component. In ear-worn device 20, the external sound capture function is used to enhance human speech or an announcement sound. The external sound capture function may be a function of reproducing the sound signal substantially without processing by loudspeaker 28 to let the user hear the sound indicated by the sound signal, and equalizing processing is not essential. DSP 22 is an example of a signal processing circuit. DSP 22 includes filter 23, signal processor 24, neural network 25, and storage 26. Neural network 25 is hereafter also referred to as NN 25.

Filter 23 includes high-pass filter **23*a*, low-pass filter 23*b*, and band-pass filter 23*c*. High-pass filter 23*a* attenuates a component in a band of 200 Hz or less contained in the sound signal output from microphone 21. Low-pass filter 23*b* attenuates a component in a band of 500 Hz or more contained in the sound signal output from microphone 21. Band-pass filter 23*c* attenuates a component in a band of 200 Hz or less and a component in a band of 5 kHz or more contained in the sound signal output from microphone 21**. These cutoff frequencies are examples, and the cutoff frequencies may be determined empirically or experimentally.

Signal processor 24 includes reverberation detector **24*a*, noise detector 24*b*, speech detector 24*c*, and switch 24*d* as functional structural elements. The functions of reverberation detector 24*a*, noise detector 24*b*, speech detector 24*c*, and switch 24*d* are implemented, for example, by a circuit that corresponds to signal processor 24 executing a computer program stored in storage 26, The functions of reverberation detector 24*a*, noise detector 24*b*, speech detector 24*c*, and switch 24*d*** will be described in detail later.

NN 25 includes speech determiner **25*a* and reverberation determiner 25*b* as functional structural elements. The functions of speech determiner 25*a* and reverberation determiner 25*b* are implemented, for example, by a circuit that corresponds to NN 25 executing a computer program stored in storage 26, The functions of speech determiner 25*a* and reverberation determiner 25*b*** will be described in detail later.

Storage 26 is a storage device that stores the computer program executed by the circuit that corresponds to signal processor 24, the computer program executed by the circuit that corresponds to NN 25, various information necessary for implementing the noise canceling function and the external sound capture function, and the like. Storage 26 is implemented by semiconductor memory or the like. Storage 26 may be implemented not as internal memory of DSP 22 but as external memory of DSP 22.

Communication module 27 receives a third sound signal from mobile terminal 30, mixes the received third sound signal and a sound signal (the below-described first sound signal or second sound signal) after signal processing output from DSP 22, and outputs the mixed sound signal to loudspeaker 28. Communication module 27 is implemented, for example, by a system-on-a-chip (SoC). Communication module 27 includes communication circuit 27*a* and mixing circuit 27*b*.

Communication circuit 27*a* receives the third sound signal from mobile terminal 30. Communication circuit 27*a* is, for example, a wireless communication circuit, and communicates with mobile terminal 30 based on a communication standard such as Bluetooth® or Bluetooth® Low Energy (BLE).

Mixing circuit 27*b* mixes the first sound signal or the second sound signal output from DSP 22 with the third sound signal received by communication circuit 27*a*, and outputs the mixed sound signal to loudspeaker 28.

Loudspeaker 28 reproduces sound based on the mixed sound signal obtained from mixing circuit 27*b*. Loudspeaker 28 is a loudspeaker that emits sound waves toward the earhole (eardrum) of the user wearing ear-worn device 20. Alternatively, loudspeaker 28 may be a bone-conduction loudspeaker.

Next, mobile terminal 30 will be described below. Mobile terminal 30 is an information terminal that functions as a user interface device in sound signal processing system 10 as a result of a predetermined application program being installed. Mobile terminal 30 also functions as a sound source that provides the third sound signal (music content) to ear-worn device 20. By operating mobile terminal 30, the user can, for example, select music content reproduced by loudspeaker 28 and switch the operation mode of ear-worn device 20. Mobile terminal 30 includes user interface (UI) 31, communication circuit 32, information processor 33, and storage 34.

UI 31 is a user interface device that receives operations by the user and presents images to the user. UI 31 is implemented by an operation receiver such as a touch panel and a display such as a display panel.

Communication circuit 32 transmits the third sound signal which is a sound signal of music content selected by the user, to ear-worn device 20. Communication circuit 32 is, for example, a wireless communication circuit, and communicates with ear-worn device 20 based on a communication standard such as Bluetooth® or BLT.

Information processor 33 performs information processing relating to displaying an image on the display, transmitting the third sound signal using communication circuit 32, etc. Information processor 33 is, for example, implemented by a microcomputer. Alternatively, information processor 33 may be implemented by a processor. The image display function, the third sound signal transmission function, and the like are implemented by a microcomputer or the like that constitutes information processor 33 executing a computer program stored in storage 34.

Storage 34 is a storage device that stores various information necessary for information processor 33 to perform the information processing, the computer program executed by information processor 33, the third sound signal (music content), and the like. Storage 34 is, for example, implemented by semiconductor memory.

[Operation Mode Setting Operation]

Figure 3:
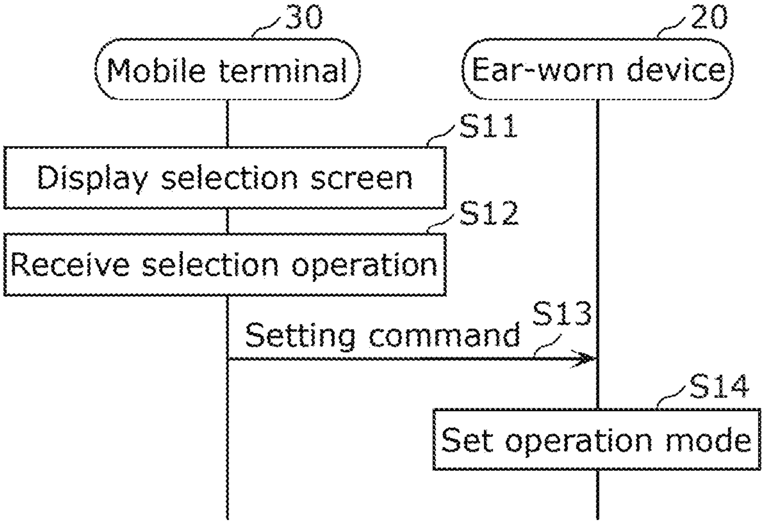
FIG. 3 is a sequence diagram of an operation mode setting operation.

Ear-worn device 20 has three operation modes, and the user can set one of the three operation modes in ear-worn device 20, Such operation mode setting operation will be described below. FIG. 3 is a sequence diagram of the operation mode setting operation.

Figure 4:
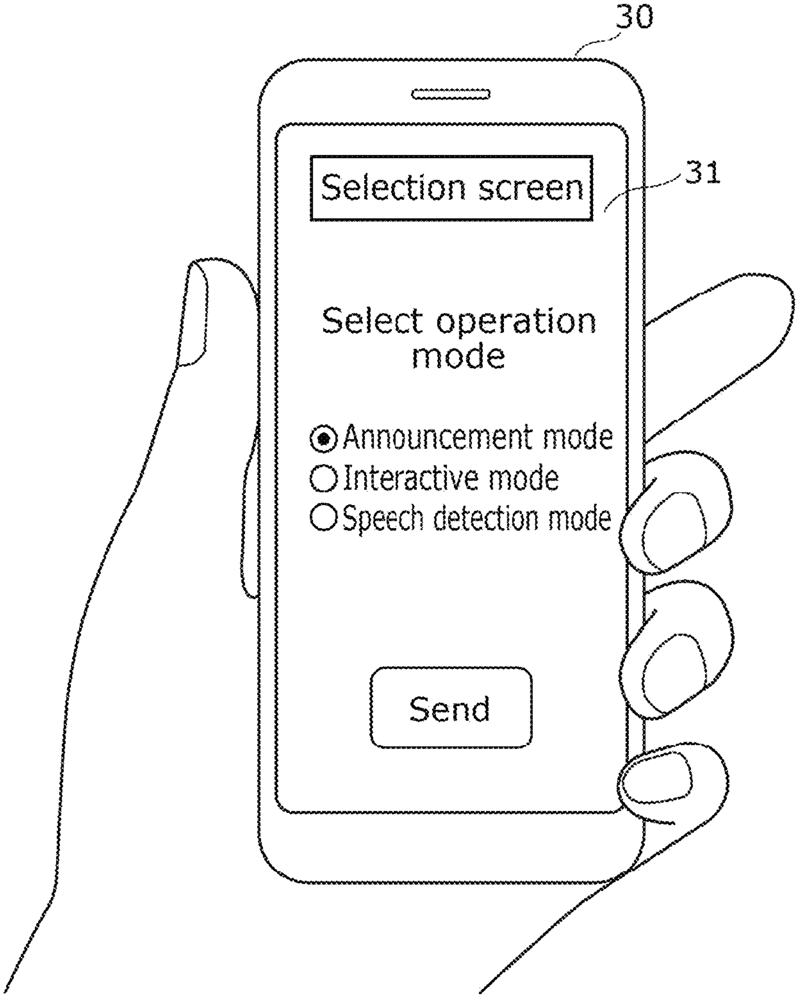
FIG. 4 is a diagram illustrating an example of an operation mode selection screen.

First, information processor 33 in mobile terminal 30 displays an operation mode selection screen on UI 31 (display) (S11). FIG. 4 is a diagram illustrating an example of the operation mode selection screen. As illustrated in FIG. 4, the operation modes include three modes: an announcement mode, an interactive mode, and a speech detection mode. The announcement mode is an operation mode in which an announcement sound is selectively enhanced to assist the user in hearing the announcement sound. The interactive mode is an operation mode in which an utterance sound that directly reaches the user is selectively enhanced to assist the user in having a conversation with another user. The speech detection mode is an operation mode in which human speech is enhanced regardless of whether the human speech is an utterance sound that directly reaches the user or an announcement sound to assist the user in hearing the human speech. Operation in each operation mode will be described in detail later.

When the selection screen is displayed, the user performs an operation mode selection operation on UI 31 in mobile terminal 30, and UI 31 receives the operation (S12). Once UI 31 has received the operation, information processor 33 transmits a setting command for setting the selected operation mode in ear-worn device 20, to ear-worn device 20 using communication circuit 32 (S13).

Communication circuit 27*a* in ear-worn device 20 receives the setting command. Once communication circuit 27*a* has received the setting command, communication module 27 transfers the setting command to DSP 22, and the operation mode selected by the user in Step S12 is set in DSP 22 (S14). Specifically, a setting value stored in storage 26 in DSP 22 is set to a value (i.e. value indicating one of the three modes) designated in the setting command.

[Example of Operation in Announcement Mode]

Figure 5:
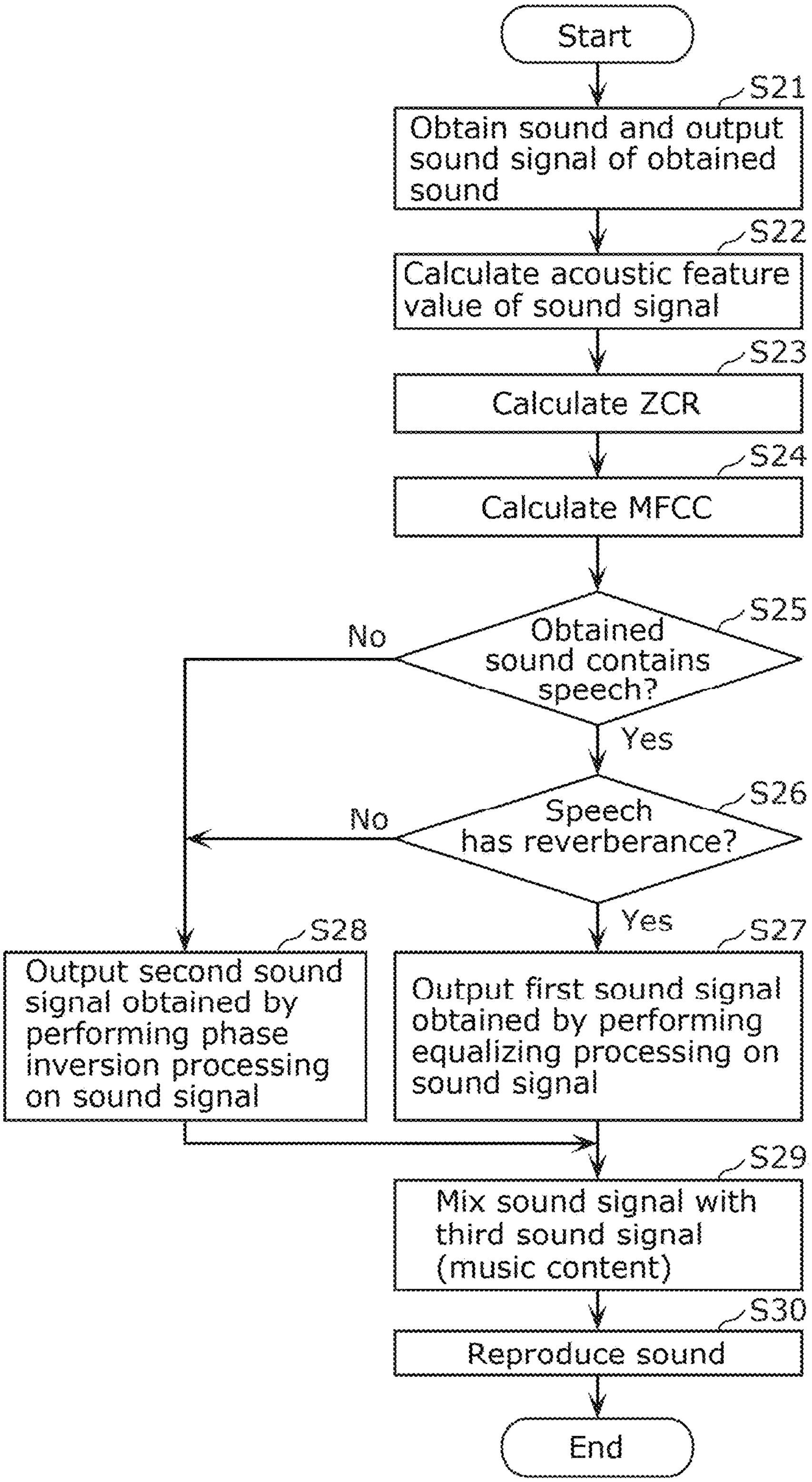
FIG. 5 is a flowchart of an example of operation in an announcement mode.

An example of operation by ear-worn device 20 set to the announcement mode will be described below. FIG. 5 is a flowchart of an example of the operation of ear-worn device 20 in the announcement mode. The announcement mode is an example of a first mode, and is an operation mode in which an announcement sound is selectively enhanced to assist the user in hearing the announcement sound.

Microphone 21 obtains a sound, and outputs a sound signal of the obtained sound (S21). Reverberation detector 24*a* performs signal processing on the sound signal output from microphone 21 and undergone filtering by high-pass filter 23*a*, to calculate an acoustic feature value of the sound signal (S22). The acoustic feature value herein is an acoustic feature value for determining whether human speech contained in the sound obtained by microphone 21 has reverberance. A specific example of the acoustic feature value will be described later. Reverberation detector 24*a* outputs the detected acoustic feature value to reverberation determiner 25*b*.

Noise detector 24*b* performs signal processing on the sound signal output from microphone 21 and undergone filtering by low-pass filter 23*b*, to calculate the zero-crossing rate (ZCR) of the sound signal (S23). The ZCR is an acoustic feature value for calculating whether the sound indicated by the sound signal is close to noise, and indicates the number of times the sound signal crosses zero or the number of times the sign of the sound signal changes. Noise detector 24*b* outputs the calculated ZCR to speech determiner 25*a*, In Step S23, another acoustic feature value for estimating noise, such as flatness (signal flatness), may be calculated. In such a case, the other acoustic feature value is used instead of the ZCR from Step S24 onward.

Speech detector 24*c* performs signal processing on the sound signal output from microphone 21 and undergone filtering by band-pass filter 23*c*, to calculate a mel-frequency cepstral coefficient (MFCC) (S24). The MFCC is a cepstral coefficient used as a feature value in speech recognition and the like, and is obtained by converting a power spectrum compressed using a mel-filter bank into a logarithmic power spectrum and applying an inverse discrete cosine transform to the logarithmic power spectrum. Speech detector 24*c* outputs the calculated MFCC to speech determiner 25*a*.

Speech determiner 25*a* determines whether the sound obtained by microphone 21 contains human speech, based on the ZCR output from noise detector 24*b* and the MFCC output from speech detector 24*c* (S25). Speech determiner 25*a* includes a first machine learning model (neural network) that receives the ZCR and the MFCC as input and outputs a determination result of whether the sound contains human speech, and can determine whether the sound obtained by microphone 21 contains human speech using the first machine learning model. Speech determiner 25*a* outputs the determination result to reverberation determiner 25*b*. The determination is not limited to being made based on both the ZCR and the MFCC, and is made based on the ZCR and/or the MFCC. That is, one of noise detector 24*b* and speech detector 24*c* may be omitted.

In the case where the determination result output from speech determiner 25*a* indicates that the sound obtained by microphone 21 contains human speech (S25: Yes), reverberation determiner 25*b* determines, based on the acoustic feature value output from reverberation detector 24*a*, whether the human speech contained in the sound obtained by microphone 21 has reverberance (S26). In this embodiment, "determining whether speech has reverberance" does not have the exact meaning, but means determining the degree (level) of reverberance in the human speech. Whether human speech has reverberance can be translated as, for example, whether reverberance contained in human speech is strong or whether a reverberant sound component contained in human speech is greater than a predetermined amount.

Specifically, reverberation determiner 25*b* inputs the acoustic feature value output from reverberation detector 24*a* to a second machine learning model (neural network) included in reverberation determiner 25*b*. The second machine learning model receives the acoustic feature value as input and outputs the determination result of whether the human speech has reverberance. Thus, by use of the second machine learning model, reverberation determiner 25*b* can determine whether the human speech contained in the sound obtained by microphone 21 has reverberance. Reverberation determiner 25*b* outputs the determination result to switch 24*d*.

Switch 24*d* switches the processing performed on the sound signal output from microphone 21 between equalizing processing (an example of first signal processing) and phase inversion processing (an example of second signal processing), based on the determination result output from speech determiner 25*a* and the determination result output from reverberation determiner 25*b*.

In the case where the determination result output from reverberation determiner 25*b* indicates that the human speech contained in the sound obtained by microphone 21 has reverberance (S26: Yes), i.e. in the case where an announcement sound is obtained by microphone 21, switch 24*d* performs equalizing processing for enhancing a specific frequency component on the sound signal, and outputs the resultant sound signal as a first sound signal (S27), For example, the specific frequency component is a frequency component of 100 Hz or more and 2 kHz or less.

Mixing circuit 27*b* mixes the first sound signal with the third sound signal (music content) received by communication circuit 27*a*, and outputs the resultant sound signal (S29). Loudspeaker 28 reproduces the sound based on the first sound signal mixed with the third sound signal (S30), Since the announcement sound is enhanced as a result of the processing in Step S27, the user of ear-worn device 20 can easily hear the announcement sound.

In each of the case where the determination result output from speech determiner 25*a* indicates that the sound obtained by microphone 21 does not contain human speech (S25: No) and the case where the determination result output from reverberation determiner 25*b* indicates that the human speech contained in the sound obtained by microphone 21 does not have reverberance (i.e. has poor reverberance) (S26: No), i.e. in the case where a sound other than an announcement sound is obtained by microphone 21, switch 24*d* performs phase inversion processing on the sound signal, and outputs the resultant sound signal as a second sound signal (S28).

Mixing circuit 27*b* mixes the second sound signal with the third sound signal (music content) received by communication circuit 27*a*, and outputs the resultant sound signal (S29). Loudspeaker 28 reproduces the sound based on the second sound signal mixed with the third sound signal (S30). Since it sounds to the user of ear-worn device 20 that the sound around ear-worn device 20 has been attenuated as a result of the processing in Step S28, the user can clearly hear the music content.

As described above, in the announcement mode, DSP 22 determines whether the human speech contained in the sound obtained by microphone 21 has reverberance. In the case where DSP 22 determines that the human speech contained in the sound has reverberance, DSP 22 outputs the first sound signal. In the case where DSP 22 determines that the human speech contained in the sound does not have reverberance, DSP 22 outputs the second sound signal. The first sound signal is a sound signal obtained by subjecting the sound signal output from microphone 21 to the equalizing processing for enhancing the specific frequency component of the sound. The second sound signal is a sound signal obtained by subjecting the sound signal output from microphone 21 to the phase inversion processing.

Thus, in the announcement mode, ear-worn device 20 can assist the user in hearing the announcement sound while attenuating sounds other than the announcement sound.

[Example of Operation in Interactive Mode]

Figure 6:
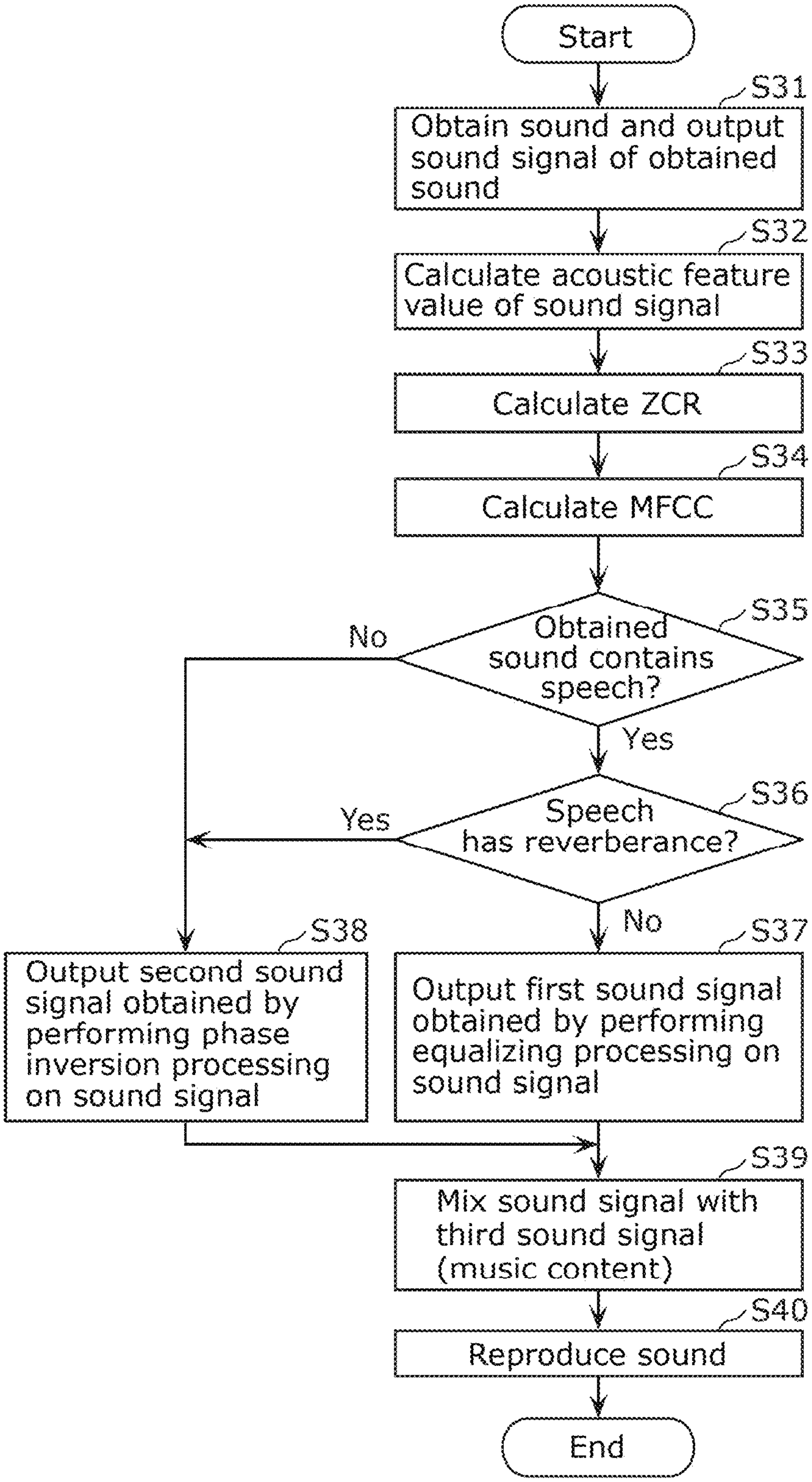
FIG. 6 is a flowchart of an example of operation in an interactive mode.

An example of operation by ear-worn device 20 set to the interactive mode will be described below, FIG. 6 is a flowchart of an example of the operation of ear-worn device 20 in the interactive mode. The interactive mode is an example of a second mode, and is an operation mode in which an utterance sound that directly reaches the user is selectively enhanced to assist the user in having a conversation with another user.

The processes in Steps S31 to S35 are the same as those in Steps S21 to S25 in the example of operation in the announcement mode. In the case where the determination result output from speech determiner 25*a* indicates that the sound obtained by microphone 21 contains human speech (S35: Yes), reverberation determiner 25*b* determines, based on the acoustic feature value output from reverberation detector 24*a*, whether the human speech contained in the sound obtained by microphone 21 has reverberance (S36).

After Step S36, switch 24*d* switches the processing performed on the sound signal output from microphone 21 between equalizing processing and phase inversion processing, based on the determination result output from speech determiner 25*a* and the determination result output from reverberation determiner 25*b*.

In the case where the determination result output from reverberation determiner 25*b* indicates that the human speech contained in the sound obtained by microphone 21 does not have reverberance (i.e. has poor reverberance) (S36: No), i.e. in the case where an utterance sound that directly reaches the user is obtained by microphone 21, switch 24*d* performs equalizing processing for enhancing a specific frequency component on the sound signal, and outputs the resultant sound signal as a first sound signal (S37). For example, the specific frequency component is a frequency component of 100 Hz or more and 2 kHz or less.

Mixing circuit 27*b* mixes the first sound signal with the third sound signal (music content) received by communication circuit 27*a*, and outputs the resultant sound signal (S39). Loudspeaker 28 reproduces the sound based on the first sound signal mixed with the third sound signal (S40). Since the utterance sound that directly reaches the user is enhanced as a result of the processing in Step S37, the user of ear-worn device 20 can easily hear the utterance sound that directly reaches the user.

In each of the case where the determination result output from speech determiner 25*a* indicates that the sound obtained by microphone 21 does not contain human speech (S35: No) and the case where the determination result output from reverberation determiner 25*b* indicates that the human speech contained in the sound obtained by microphone 21 has reverberance (S36: Yes), i.e. in the case where a sound other than an utterance sound that directly reaches the user is obtained by microphone 21, switch 24*d* performs phase inversion processing on the sound signal, and outputs the resultant sound signal as a second sound signal (S38).

Mixing circuit 27*b* mixes the second sound signal with the third sound signal (music content) received by communication circuit 27*a*, and outputs the resultant sound signal (S39). Loudspeaker 28 reproduces the sound based on the second sound signal mixed with the third sound signal (S40). Since it sounds to the user of ear-worn device 20 that the sound around ear-worn device 20 has been attenuated as a result of the processing in Step S38, the user can clearly hear the music content.

As described above, in the interactive mode, DSP 22 determines whether the human speech contained in the sound obtained by microphone 21 has reverberance. In the case where DSP 22 determines that the human speech contained in the sound does not have reverberance, DSP 22 outputs the first sound signal. In the case where DSP 22 determines that the human speech contained in the sound has reverberance, DSP 22 outputs the second sound signal. The first sound signal is a sound signal obtained by subjecting the sound signal output from microphone 21 to the equalizing processing for enhancing the specific frequency component of the sound. The second sound signal is a sound signal obtained by subjecting the sound signal output from microphone 21 to the phase inversion processing.

Thus, in the interactive mode, ear-worn device 20 can assist the user in having a conversation with another user while attenuating sounds other than the utterance sound that directly reaches the user.

[Example of Operation in Speech Detection Mode]

Figure 7:
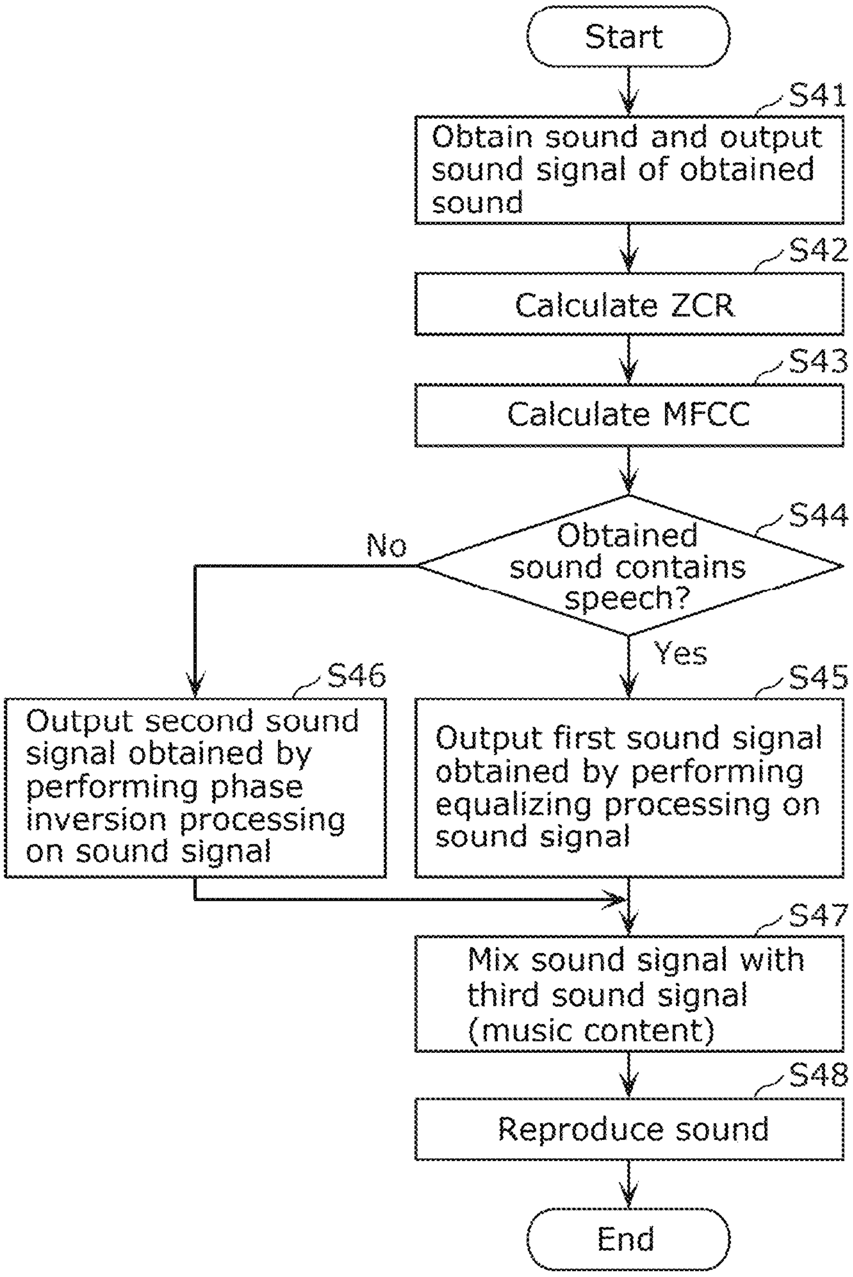
FIG. 7 is a flowchart of an example of operation in a speech detection mode.

An example of operation by ear-worn device 20 set to the speech detection mode will be described below. FIG. 7 is a flowchart of an example of the operation of ear-worn device 20 in the speech detection mode. The speech detection mode is an example of a third mode, and is an operation mode in which human speech is enhanced regardless of whether the human speech is an utterance sound that directly reaches the user or an announcement sound to assist the user in hearing the human speech.

Microphone 21 obtains a sound, and outputs a sound signal of the obtained sound (S41). Noise detector 24*b* performs signal processing on the sound signal output from microphone 21 and undergone filtering by low-pass filter 23*b*, to calculate the ZCR of the sound signal (S42), Noise detector 24*b* outputs the calculated ZCR to speech determiner 25*a*.

Speech detector 24*c* performs signal processing on the sound signal output from microphone 21 and undergone filtering by band-pass filter 23*c*, to calculate a MFCC (S43). Speech detector 24*c* outputs the calculated MFCC to speech determiner 25*a*.

Speech determiner 25*a* determines whether the sound obtained by microphone 21 contains human speech, based on the ZCR output from noise detector 24*b* and the MFCC output from speech detector 24*c* (S44). The specific process in Step S44 is the same as that in each of Steps S25 and S35.

Switch 24*d* switches the processing performed on the sound signal output from microphone 21 between equalizing processing and phase inversion processing, based on the determination result output from speech determiner 25*a*.

In the case where the determination result output from speech determiner 25*a* indicates that the sound obtained by microphone 21 contains human speech (S44: Yes), switch 24*d* performs equalizing processing for enhancing a specific frequency component on the sound signal, and outputs the resultant sound signal as a first sound signal (S45), For example, the specific frequency component is a frequency component of 100 Hz or more and 2 kHz or less.

Mixing circuit 27*b* mixes the first sound signal with the third sound signal (music content) received by communication circuit 27*a*, and outputs the resultant sound signal (S47). Loudspeaker 28 reproduces the sound based on the first sound signal mixed with the third sound signal (S48). Since the speech is enhanced as a result of the processing in Step S45, the user of ear-worn device 20 can easily hear the speech.

In the case where the determination result output from speech determiner 25*a* indicates that the sound obtained by microphone 21 does not contain human speech (S44: No), switch 24*d* performs phase inversion processing on the sound signal, and outputs the resultant sound signal as a second sound signal (S46).

Mixing circuit 27*b* mixes the second sound signal with the third sound signal (music content) received by communication circuit 27*a*, and outputs the resultant sound signal (S47). Loudspeaker 28 reproduces the sound based on the second sound signal mixed with the third sound signal (S48). Since it sounds to the user of ear-worn device 20 that the sound around ear-worn device 20 has been attenuated as a result of the processing in Step S46, the user can clearly hear the music content.

As described above, in the speech detection mode, DSP 22 determines whether the sound obtained by microphone 21 contains human speech. In the case where DSP 22 determines that the sound obtained by microphone 21 contains human speech, DSP 22 outputs the first sound signal. In the case where DSP 22 determines that the sound obtained by microphone 21 does not contain human speech, DSP 22 outputs the second sound signal. The first sound signal is a sound signal obtained by subjecting the sound signal output from microphone 21 to the equalizing processing for enhancing the specific frequency component of the sound. The second sound signal is a sound signal obtained by subjecting the sound signal output from microphone 21 to the phase inversion processing.

Thus, in the speech detection mode, ear-worn device 20 can assist the user in hearing the human speech while attenuating sounds other than the human speech.

Example 1 of Acoustic Feature Value

Figure 8:
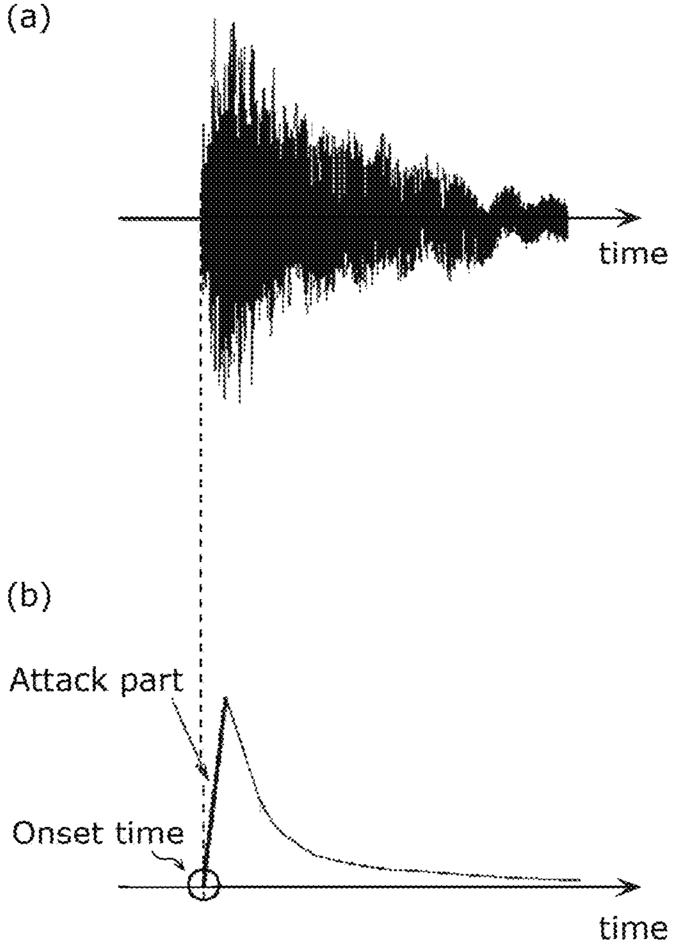
FIG. 8 is a diagram for explaining an onset time.

Example 1 of the acoustic feature value calculated by reverberation detector 24*a* will be described below. As the acoustic feature value, for example, onset information indicating the relationship between the temporal change in sound pressure level of the sound signal and the onset time is used. The onset information is information including a waveform indicating the temporal change in sound pressure level and the position of the onset time in the waveform. FIG. 8 is a diagram for explaining the onset time. (a) in FIG. 8 illustrates the temporal change of the waveform of the sound signal, and (b) in FIG. 8 illustrates the temporal change of the sound power. In more detail, in (b) in FIG. 8, a mel spectrogram calculated by frequency decomposition of the waveform in (a) in FIG. 8 is superimposed and an envelope is taken in the time direction. As illustrated in FIG. 8, the onset time denotes the time at which sound output starts.

Figure 9:
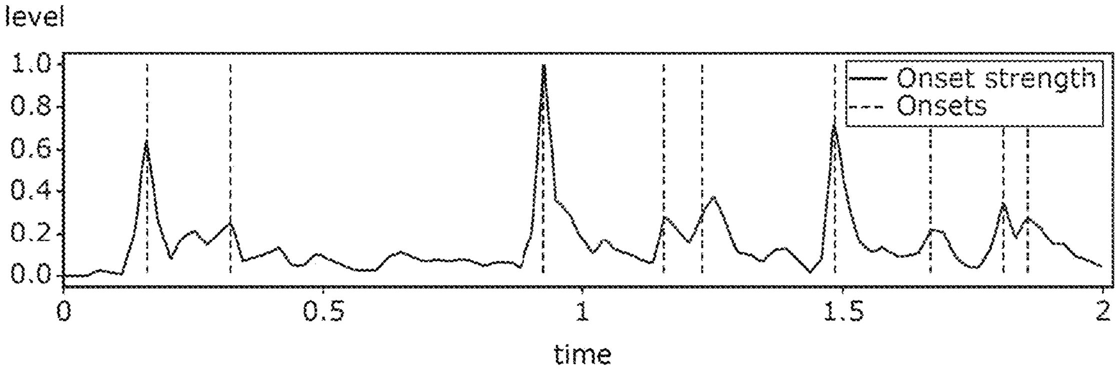
FIG. 9 is a diagram illustrating an example of onset information of a human utterance sound that reaches directly.
Figure 10:
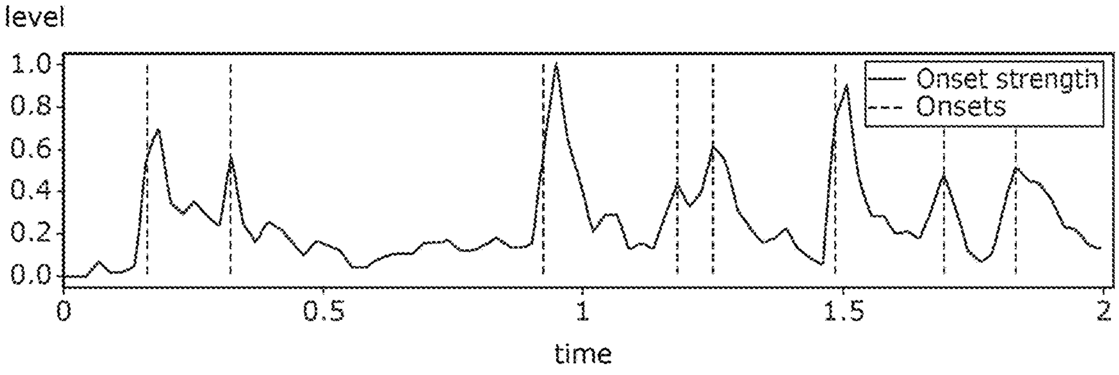
FIG. 10 is a diagram illustrating an example of onset information of an announcement sound.

FIG. 9 is a diagram illustrating an example of onset information of a human utterance sound that reaches directly, FIG. 10 is a diagram illustrating an example of onset information of an announcement sound. FIG. 9 illustrates onset information obtained in the case where the microphone directly obtains human speech, FIG. 10 illustrates onset information obtained in the case where the microphone obtains the same human speech indirectly via the loudspeaker, That is, the onset information in FIG. 9 and the onset information in FIG. 10 differ only in whether there is reverberation (the degree of reverberation).

In each of FIG. 9 and FIG. 10, the solid line indicates the overall temporal change in sound pressure level obtained by performing frequency analysis (specifically, frequency decomposition and calculation of time-series envelope from mel spectrogram) on the sound signal of the human speech to extract the sound pressure level at each frequency and superimposing the extracted sound pressure level. In each of FIG. 9 and FIG. 10, the dashed lines indicate onset times. The sound pressure level at each frequency is extracted by frequency-analyzing the sound signal of the human speech, and each onset time in FIG. 9 and FIG. 10 is specified based on the change in sound pressure level at the frequency corresponding to the highest sound pressure level.

Thus, the onset information is information including the waveform indicating the temporal change in sound pressure level and the position of the onset time in the waveform. In each of Steps S22 and S32, reverberation detector 24*a* calculates such onset information as the acoustic feature value and outputs the onset information to reverberation determiner 25*b*.

The second machine learning model included in reverberation determiner 25*b* is built beforehand by learning each onset information pair such as those illustrated in FIG. 9 and FIG. 10 (i.e. pair of onset information that differ only in whether there is reverberation), In the learning, each item of onset information is given (annotated with) a label of whether there is reverberation.

Thus, DSP 22 calculates the onset information from the sound signal. Based on the calculated onset information, DSP 22 can determine whether the human speech contained in the sound obtained by microphone 21 has reverberance.

Example 2 of Acoustic Feature Value

Figure 11:
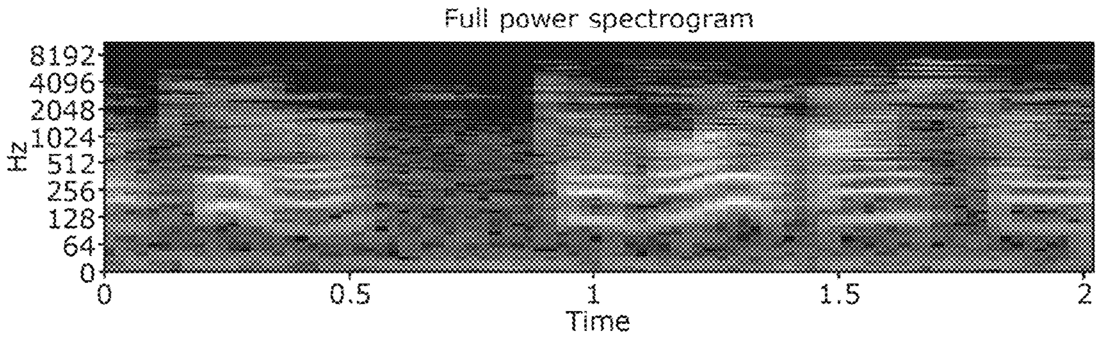
FIG. 11 is a diagram illustrating a power spectrum of a human utterance sound that reaches directly.
Figure 12:
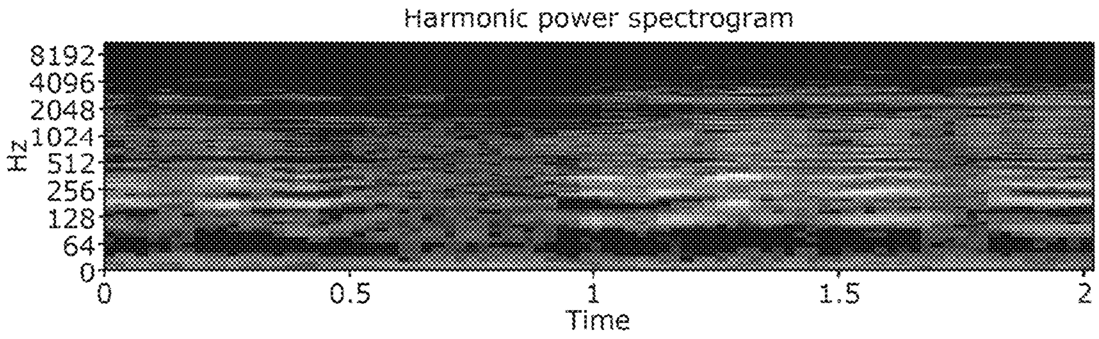
FIG. 12 is a diagram illustrating a power spectrum of a reverberant sound contained in the human utterance sound that reaches directly.
Figure 13:
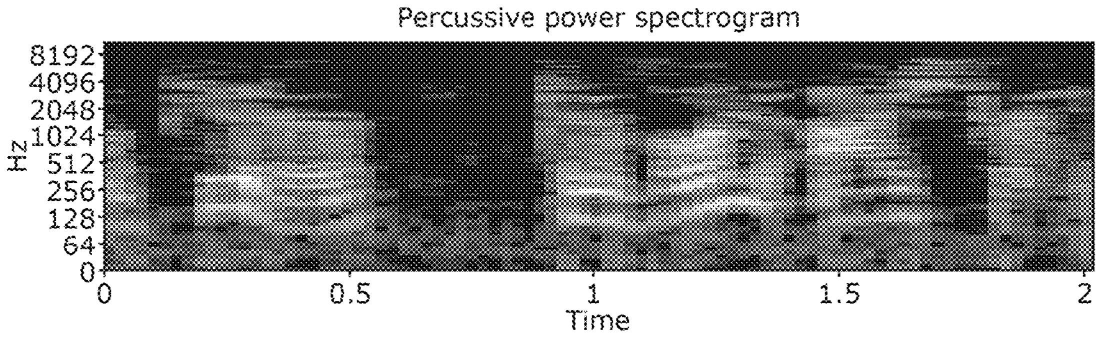
FIG. 13 is a diagram illustrating a power spectrum of an attack sound contained in the human utterance sound that reaches directly.
Figure 14:
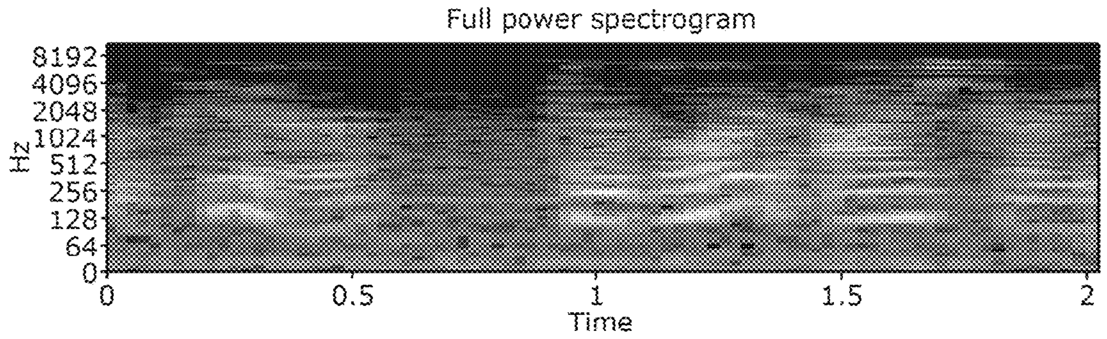
FIG. 14 is a diagram illustrating a power spectrum of an announcement sound.
Figure 15:
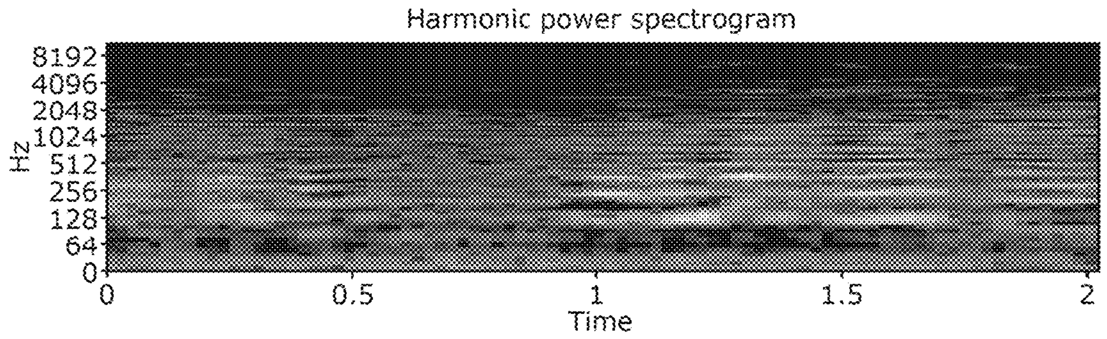
FIG. 15 is a diagram illustrating a power spectrum of a reverberant sound contained in the announcement sound.
Figure 16:
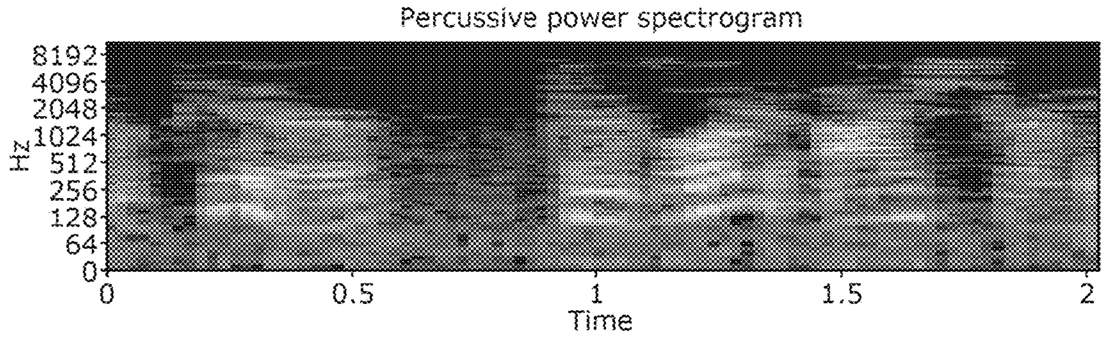
FIG. 16 is a diagram illustrating a power spectrum of an attack sound contained in the announcement sound.

Example 2 of the acoustic feature value calculated by reverberation detector 24*a* will be described below. As the acoustic feature value, for example, the power spectrum of a reverberant sound is used. FIG. 11 is a diagram illustrating the power spectrum of an utterance sound that directly reaches the user. FIG. 12 is a diagram illustrating the power spectrum of a reverberant sound contained in the utterance sound that directly reaches the user, FIG. 13 is a diagram illustrating the power spectrum of an attack sound contained in the utterance sound that directly reaches the user. FIG. 14 is a diagram illustrating the power spectrum of an announcement sound. FIG. 15 is a diagram illustrating the power spectrum of a reverberant sound contained in the announcement sound. FIG. 16 is a diagram illustrating the power spectrum of an attack sound contained in the announcement sound. In each of FIG. 11 to FIG. 16, whiter parts have higher power values, and blacker parts have lower power values. The utterance sound that directly reaches the user with reference to FIG. 11 to FIG. 13 and the announcement sound with reference to FIG. 14 to FIG. 16 differ only in whether there is reverberation (the degree of reverberation).

The power spectrum of the reverberant sound is a partial power spectrum except the attack part in (b) in FIG. 8. The power spectrum of the reverberant sound is a power spectrum obtained by extracting a continuous section in the time domain. Specifically, the power spectrum of the reverberation sound is matrix information in which each element indicates a power value. The attack part is a part from a point at which the sound is generated to a point at which the sound pressure reaches its peak, where a section continuous with respect to the frequency domain (i.e. in a state in which the sound is produced in a wide frequency band) is captured on the time axis. The power spectrum of the attack sound is a power spectrum obtained by extracting a continuous section in the frequency domain.

In each of Steps S22 and S32, reverberation detector 24*a* calculates the power spectrum of the reverberant sound as the acoustic feature value and outputs the power spectrum of the reverberant sound to reverberation determiner 25*b*. Any existing method may be used to calculate the power spectrum of the reverberant sound. Here, harmonic/percussive source separation (HPSS) modified for reverberation detection is used.

The second machine learning model included in reverberation determiner 25*b* is built beforehand by learning each reverberant sound power spectrum pair such as those illustrated in FIG. 12 and FIG. 15 (i.e. pair of reverberant sound power spectra that differ only in whether there is reverberation). In the learning, each power spectrum of reverberant sound is given (annotated with) a label of whether there is reverberation.

Thus, DSP 22 calculates the power spectrum of the reverberant sound from the sound signal. Based on the calculated power spectrum of the reverberant sound, DSP 22 can determine whether the human speech has reverberance.

Effects, Etc.

As described above, ear-worn device 20 includes: microphone 21 that obtains a sound and outputs a sound signal of the sound obtained; DSP 22 that performs signal processing on the sound signal to determine whether speech contained in the sound has reverberance, and outputs, based on a result of the determination, a first sound signal obtained by performing first signal processing on the sound signal; loudspeaker 28 that reproduces the sound based on the first sound signal output; and housing 29 that contains microphone 21, DSP 22, and loudspeaker 28. The DSP is an example of a signal processing circuit.

Such ear-worn device 20 can perform signal processing while distinguishing between a sound signal of an utterance sound that directly reaches the user and a sound signal of an announcement sound.

For example, DSP 22 selectively outputs, based on the result of the determination, the first sound signal and a second sound signal obtained by performing second signal processing on the sound signal, the second signal processing being different from the first signal processing. Loudspeaker 28 reproduces the sound based on the first sound signal output or the second sound signal output.

Such ear-worn device 20 can perform signal processing that differs between the sound signal of the utterance sound that directly reaches the user and the sound signal of the announcement sound.

For example, the first signal processing includes equalizing processing for enhancing a specific frequency component of the obtained sound, and the second signal processing includes phase inversion processing.

Such ear-worn device 20 can enhance one of the direct sound and the announcement sound and attenuate the other one of the direct sound and the announcement sound.

For example, DSP 22 outputs the first sound signal when DSP 22 determines that the speech contained in the sound has reverberance, and outputs the second sound signal when DSP 22 determines that the speech contained in the sound does not have reverberance.

Such ear-worn device 20 can enhance the announcement sound and attenuate the direct sound. Ear-worn device 20 can thus assist the user in hearing the announcement sound.

For example, DSP 22 outputs the first sound signal when DSP 22 determines that the speech contained in the sound does not have reverberance, and outputs the second sound signal when DSP 22 determines that the speech contained in the sound has reverberance.

Such ear-worn device 20 can enhance the utterance sound that directly reaches the user and attenuate the announcement sound. Ear-worn device 20 can thus assist the user in having a conversation with another user talking to the user.

For example, DSP 22 selectively operates in an announcement mode and an interactive mode. in the announcement mode, DSP 22 outputs the first sound signal when DSP 22 determines that the speech contained in the sound has reverberance, and outputs the second sound signal when DSP 22 determines that the speech contained in the sound does not have reverberance. In the interactive mode, DSP 22 outputs the first sound signal when DSP 22 determines that the speech contained in the sound does not have reverberance, and outputs the second sound signal when DSP 22 determines that the speech contained in the sound has reverberance. The announcement mode is an example of a first mode, and the interactive mode is an example of a second mode.

Such ear-worn device 20 can selectively perform the operation in the announcement mode in which the announcement sound is enhanced and the utterance sound that directly reaches the user is attenuated and the operation in the interactive mode in which the utterance sound that directly reaches the user is enhanced and the announcement sound is attenuated.

For example, DSP 22 selectively operates in the announcement mode, the interactive mode, and a speech detection mode. In the speech detection mode, DSP 22 performs signal processing on the sound signal to determine whether the sound obtained contains speech, outputs the first sound signal when DSP 22 determines that the sound obtained contains speech, and outputs the second sound signal when DSP 22 determines that the sound obtained does not contain speech. The speech detection mode is an example of a third mode.

Such ear-worn device 20 can perform the operation in the speech detection mode in which the human speech is enhanced and the noise is attenuated, in addition to the operation in the announcement mode and the operation in the interactive mode.

For example, DSP 22 performs the signal processing on the sound signal to calculate a power spectrum of a reverberant sound contained in the sound, and, based on the power spectrum calculated, determines whether the speech contained in the sound has reverberance.

Such ear-worn device 20 can determine whether the speech has reverberance based on the power spectrum of the reverberant sound.

For example, DSP 22 performs the signal processing on the sound signal to calculate onset information indicating a temporal change in sound pressure level of the sound signal and an onset time, and, based on the onset information calculated, determines whether the speech contained in the sound has reverberance.

Such ear-worn device 20 can determine whether the human speech has reverberance based on the onset information.

For example, ear-worn device 20 further includes mixing circuit 27*b* that mixes the first sound signal output with a third sound signal provided from mobile terminal 30, Loudspeaker 28 reproduces the sound based on the first sound signal mixed with the third sound signal. Mobile terminal 30 is an example of a sound source.

Such ear-worn device 20 can perform, for example, the operation in the announcement mode during the reproduction of the third sound signal.

A reproduction method executed by a computer such as ear-worn device 20 includes: Step S26 of performing signal processing on a sound signal of a sound output from a microphone that obtains the sound, to determine whether speech contained in the sound has reverberance; Step S27 of outputting a first sound signal obtained by performing first signal processing on the sound signal, based on a result of the determination in Step S26; and Step S30 of reproducing the sound based on the first sound signal output.

Such reproduction method can perform signal processing while distinguishing between a sound signal of an utterance sound that directly reaches the user and a sound signal of an announcement sound.

Other Embodiments

While the embodiment has been described above, the present disclosure is not limited to the foregoing embodiment.

For example, although the foregoing embodiment describes the case where the ear-worn device is an earphone-type device, the ear-worn device may be a headphone-type device. Although the foregoing embodiment describes the case where the ear-worn device selectively operates in the three operation modes, the ear-worn device may be a device having at least one of the three operation modes, or a device specialized for one of the three operation modes.

Although the foregoing embodiment describes the case where the ear-worn device has the function of reproducing music content, the ear-worn device may not have the function (communication module) of reproducing music content. For example, the ear-worn device may be an earplug having the noise canceling function and the external sound capture function.

Although the foregoing embodiment describes the case where the machine learning model is used to determine whether the sound obtained by the microphone contains speech, the determination may be made based on another algorithm without using any machine learning model. The same applies to the determination of whether the speech has reverberance.

The structure of the ear-worn device according to the foregoing embodiment is an example. For example, the ear-worn device may include structural elements not illustrated, such as a EVA converter, a filter, a power amplifier, and an A/D converter.

Although the foregoing embodiment describes the case where the sound signal processing system is implemented by a plurality of devices, the sound signal processing system may be implemented as a single device. In the case where the sound signal processing system is implemented by a plurality of devices, the functional structural elements in the sound signal processing system may be allocated to the plurality of devices in any way. For example, all or part of the functional structural elements included in the ear-worn device in the foregoing embodiment may be included in the mobile terminal.

The method of communication between devices in the foregoing embodiment is not limited. In the case where two devices communicate with each other in the foregoing embodiment, a relay device (not illustrated) may be located between the two devices.

The orders of processes described in the foregoing embodiment are merely examples. A plurality of processes may be changed in order, and a plurality of processes may be performed in parallel. The processes performed by any specific processing unit may be performed by another processing unit. Part of digital signal processing described in the foregoing embodiment may be realized by analog signal processing.

Each of the structural elements in the foregoing embodiment may be implemented by executing a software program suitable for the structural element. Each of the structural elements may be implemented by means of a program executing unit, such as a CPU or a processor, reading and executing the software program recorded on a recording medium such as a hard disk or a semiconductor memory.

Each of the structural elements may be implemented by hardware. For example, the structural elements may be circuits (or integrated circuits). These circuits may constitute one circuit as a whole, or may be separate circuits. These circuits may each be a general-purpose circuit or a dedicated circuit.

The general and specific aspects of the present disclosure may be implemented using a system, a device, a method, an integrated circuit, a computer program, or a computer-readable recording medium such as CD-ROM, or any combination of systems, devices, methods, integrated circuits, computer programs, and recording media. For example, the presently disclosed techniques may be implemented as a reproduction method executed by a computer such as an ear-worn device or a mobile terminal, or implemented as a program for causing the computer to execute the reproduction method. The presently disclosed techniques may be implemented as a computer-readable non-transitory recording medium having the program recorded thereon. The program herein includes an application program for causing a general-purpose mobile terminal to function as the mobile terminal in the foregoing embodiment.

Other modifications obtained by applying various changes conceivable by a person skilled in the art to each embodiment and any combinations of the structural elements and functions in each embodiment without departing from the scope of the present disclosure are also included in the present disclosure.

INDUSTRIAL APPLICABILITY

The ear-worn device according to the present disclosure can perform signal processing while distinguishing between a sound signal of a sound having a relatively strong direct sound component and a sound signal of a sound having a relatively strong indirect sound component.

REFERENCE SIGNS LIST

10 sound signal processing system
20 ear-worn device
21 microphone
22 DSP
23 filter
**23*a*** high-pass filter
**23*b*** low-pass filter
**23*c*** band-pass filter
24 signal processor
**24*a*** reverberation detector
**24*b*** noise detector
**24*c*** speech detector
**24*d*** switch
25 neutral network
**25*a*** speech determiner
**25*b*** reverberation determiner
26 storage
27 communication module
**27*a*** communication circuit
**27*b*** mixing circuit
28 loudspeaker
29 housing
30 mobile terminal
31 UI
32 communication circuit
33 information processor
34 storage

The invention claimed is:

1. An ear-worn device comprising:

a microphone that obtains a sound and outputs a sound signal of the sound obtained;

a signal processing circuit that performs signal processing on the sound signal to determine whether speech contained in the sound has reverberance, and outputs, based on a result of the determination, a first sound signal obtained by performing first signal processing on the sound signal;

a loudspeaker that reproduces a sound based on the first sound signal output; and a housing that contains the microphone, the signal processing circuit, and the loudspeaker, wherein the first signal processing includes equalizing processing for enhancing a frequency component of the speech obtained.

2. The ear-worn device according to claim 1, wherein the signal processing circuit selectively outputs, based on the result of the determination, the first sound signal and a second sound signal obtained by performing second signal processing on the sound signal, the second signal processing being different from the first signal processing, and the loudspeaker reproduces the sound based on the first sound signal output or a sound based on the second sound signal output.

3. The ear-worn device according to claim 2, wherein the second signal processing includes phase inversion processing.

4. The ear-worn device according to claim 3, wherein the signal processing circuit outputs the first sound signal when the signal processing circuit determines that the speech contained in the sound has reverberance, and outputs the second sound signal when the signal processing circuit determines that the speech contained in the sound does not have reverberance.

5. The ear-worn device according to claim 3, wherein the signal processing circuit outputs the first sound signal when the signal processing circuit determines that the speech contained in the sound does not have reverberance, and outputs the second sound signal when the signal processing circuit determines that the speech contained in the sound has reverberance.

6. The ear-worn device according to claim 3, wherein the signal processing circuit selectively operates in a first mode and a second mode, in the first mode, the signal processing circuit outputs the first sound signal when the signal processing circuit determines that the speech contained in the sound has reverberance, and in the second mode, the signal processing circuit outputs the second sound signal when the signal processing circuit determines that the speech contained in the sound has reverberance.

7. The ear-worn device according to claim 6, wherein the signal processing circuit selectively operates in the first mode, the second mode, and a third mode, and in the third mode, the signal processing circuit performs signal processing on the sound signal to determine whether the sound obtained contains speech, outputs the first sound signal when the signal processing circuit determines that the sound obtained contains speech, and outputs the second sound signal when the signal processing circuit determines that the sound obtained does not contain speech.

8. The ear-worn device according to claim 1, wherein the signal processing circuit performs the signal processing on the sound signal to calculate a power spectrum of a reverberant sound contained in the sound, and, based on the power spectrum calculated, determines whether the speech contained in the sound has reverberance.

9. The ear-worn device according to claim 1, wherein the signal processing circuit performs the signal processing on the sound signal to calculate onset information indicating a temporal change in sound pressure level of the sound signal and an onset time, and, based on the onset information calculated, determines whether the speech contained in the sound has reverberance.

10. The ear-worn device according to claim 1, further comprising:

a mixing circuit that mixes the first sound signal output with a third sound signal provided from a sound source, and the loudspeaker reproduces a sound based on the first sound signal mixed with the third sound signal.

11. A reproduction method comprising:

performing signal processing on a sound signal of a sound output from a microphone that obtains the sound, to determine whether speech contained in the sound has reverberance;

outputting a first sound signal obtained by performing first signal processing on the sound signal, based on a result of the determination in the performing; and reproducing a sound based on the first sound signal output, wherein the first signal processing includes equalizing processing for enhancing a frequency component of the speech.

12. A computer-readable non-transitory recording medium having recorded thereon a program for causing a computer to execute the reproduction method according to claim 11.

13. The ear-worn device according to claim 3, wherein the signal processing circuit selectively operates in a first mode and a second mode, in the first mode, the signal processing circuit outputs the second sound signal when the signal processing circuit determines that the speech contained in the sound does not have reverberance, and in the second mode, the signal processing circuit outputs the first sound signal when the signal processing circuit determines that the speech contained in the sound does not have reverberance.

14. An ear-worn device comprising:

a microphone that obtains a sound and outputs a sound signal of the sound obtained;

a signal processing circuit that performs signal processing on the sound signal to determine whether speech contained in the sound has reverberance, and outputs, based on a result of the determination, a processed sound signal obtained by performing phase inversion processing on the sound signal;

a loudspeaker that reproduces a sound based on the processed sound signal output to attenuate environmental sound around a user wearing the ear-worn device; and a housing that contains the microphone, the signal processing circuit, and the loudspeaker.

15. The ear-worn device according to claim 14, wherein the signal processing circuit selectively outputs, based on the result of the determination, the processed sound signal and a second sound signal obtained by performing signal processing on the sound signal, the signal processing being different from the phase inversion processing, and the loudspeaker reproduces a sound based on the processed sound signal output or the second sound signal output.

* * * * *